United States Patent [19]

Farmerie

[11] Patent Number: 4,558,022

[45] Date of Patent: Dec. 10, 1985

[54] REGENERATION OF CAUSTIC IMPREGNATED ACTIVATED CARBONS

[75] Inventor: John J. Farmerie, Coraopolis, Pa.

[73] Assignee: Calgon Carbon Corporation, Pittsburgh, Pa.

[21] Appl. No.: 673,804

[22] Filed: Nov. 21, 1984

Related U.S. Application Data

[63] Continuation of Ser. No. 246,766, Mar. 23, 1981, abandoned, which is a continuation-in-part of Ser. No. 231,485, Feb. 6, 1981, abandoned.

[51] Int. Cl.$^4$ .................. B01J 20/34; B01D 53/04
[52] U.S. Cl. .................................. 502/25; 55/73; 210/670; 210/694
[58] Field of Search ............... 423/230; 210/670, 694; 55/73; 502/25, 27

[56] References Cited

U.S. PATENT DOCUMENTS

| | | | |
|---|---|---|---|
| 2,589,750 | 3/1952 | Van Nouhys | 502/25 |
| 2,872,412 | 2/1959 | McNeill et al. | 208/403 |
| 3,792,571 | 2/1974 | Waki et al. | 423/230 |
| 3,965,037 | 6/1976 | Kennedy | 502/25 |
| 4,072,479 | 2/1978 | Sinha | 55/73 |
| 4,072,480 | 2/1978 | Wagner | 55/74 |
| 4,187,195 | 2/1980 | Kennedy | 502/25 |
| 4,273,751 | 6/1981 | Sinha et al. | 423/244 |
| 4,369,168 | 1/1983 | Wells et al. | 502/25 |
| 4,407,725 | 10/1983 | Allen et al. | 502/25 |

FOREIGN PATENT DOCUMENTS

| | | |
|---|---|---|
| 0004807 | 10/1979 | European Pat. Off. . |
| 2046005 | 6/1971 | Fed. Rep. of Germany . |
| 1049195 | 4/1976 | Japan . |
| 1126393 | 11/1976 | Japan . |
| 1394031 | 5/1975 | United Kingdom . |

OTHER PUBLICATIONS

Chem. Stosowana, Ser. A9 (3) 287–294, (1965).
In Chem. Abstracts 64,—1379c, (1966).

*Primary Examiner*—P. E. Konopka
*Attorney, Agent, or Firm*—R. B. Olson; W. C. Mitchell; E. V. Linek

[57] ABSTRACT

An improved process for the regeneration of activated carbon impregnated with caustic is described. A three stage wash with caustic solutions of from 30 to 50 percent and from 5 to 25 percent removes both organic and sulfur contaminants. This regeneration returns the carbon essentially to its original capacity for adsorption of malodorous compounds.

5 Claims, No Drawings

REGENERATION OF CAUSTIC IMPREGNATED ACTIVATED CARBONS

This application is a continuation of U.S. Ser. No. 246,766, filed Mar. 23, 1981, and now abandoned, which is a continuation-in-part of U.S. Ser. No. 231,485, filed Feb. 6, 1981 and now abandoned.

This invention is directed to a process for the regeneration of activated carbon impregnated with caustic.

BACKGROUND OF THE INVENTION

This invention especially relates to the regeneration of caustic impregnated activated carbon by a three stage process, involving the use of both a high concentration (30 to 50 percent) and then a low concentration (5 to 25 percent) NaOH or KOH solution.

Activated carbons impregnated with NaOH have been described in U.S. Pat. No. 4,072,479 to Sinha et al. and it is my intent to incorporate by reference the contents of the Sinha et al. patent.

Activated carbons impregnated with KOH have been described in G.B. Pat. No. 1,394,031 to Cooley et al. and in Swinarski et al. Chem. Stosowana, Ser. A 9(3), 287–94 (1965), (Chemical Abstracts, Vol. 64, 1379c).

Caustic impregnated carbons are excellent adsorbents for malodorous sulfur and organic compounds. As used herein, caustic impregnated carbon refers to carbon impregnated with either NaOH or KOH. Caustic, therefore, is defined as NaOH or KOH and may also include any other alkali metal hydroxide. Typical malodorous sulfur containing compounds include principally hydrogen sulfide, mercaptans and sulfides. The malodorous organic compounds include all of those compounds formed by the bacterial breakdown of higher organic compounds, for example, compounds associated with sewer treatment facilities.

Adsorption of such malodorous compounds reduces the effective capacity of the carbon for further adsorption. At some point in time (known as the breakthrough), the carbon becomes spent, that is, it looses its capacity to adsorb. At that point, the carbon must be regenerated.

Prior to the discovery of the three step regeneration process of the present invention, carbons of the type described by Sinha et al. were regenerated by treatment of the spent carbon with a 50 percent NaOH solution for at least 18 hours, followed by one water rinse.

By using the process of the present invention, a high concentration caustic wash followed by a low concentration caustic wash, or vice versa, improved regeneration of adsorptive capacity of from 10 to 20 percent over the processes of the prior art is achieved.

SUMMARY OF THE INVENTION

The object of this invention is the improved regeneration of the adsorptive capacity of activated carbons impregnated with caustic. This invention allows for longer useful lifetime of the impregnated carbon, inexpensive reagents and convenient modes of operation.

Thus there is provided a process for the regeneration of spent caustic impregnated activated carbon which comprises the three steps of; (a) wetting the spent carbon with water at a minimum temperature of 33° F. to deaerate said carbon; (b) treating the wetted spent carbon with an initial caustic solution at a minimum temperature of 50° F. for a contact time sufficient to remove some contaminants; and (c) treating the spent carbon from step (b) with a second caustic solution at a minimum temperature of 50° F. for a contact time sufficient to remove contaminants not removed in step (b).

DETAILED DESCRIPTION

Four parameters have been found to be important in the regeneration of caustic impregnated carbon via the process of this invention: (a) moisture content on the carbon; (b) caustic solution temperature; (c) caustic solution concentrations; and (d) contact times.

Moisture content on the spent carbon prior to regeneration with the caustic solutions is a critical factor in the effeciency of this process. Irrespective of the moisture content on the active carbon, either before or after adsorption, the carbon must be wetted prior to regeneration. Wetting the carbon deaerates the carbon and thereby increases the removal of both the organic and sulfur contaminants. The terms "wetting or wetted" as used herein, refer to passing at least one bed volume of water through the spent carbon bed. By definition, wetted carbon contains at least 25 weight percent moisture on the carbon after the wetting, while the typical dry carbon contains no more than 18 weight percent moisture. The preferred moisture content on the wetted carbon is from 30 to 40 weight percent or at least 25 weight percent. The water wetting may be carried out at a minimum temperature of 33° F. The preferred temperature range is from 72° F. to 170° F. with 120° F. most preferred. After regeneration of the carbon, as described below, moistue content on the carbon may be as high as 40 weight percent. Prior to reuse, this moisture content should be reduced to from 18 to 25 weight percent, preferably to less than 18 weight percent.

Sulfur and organic contaminants are removed by two different caustic concentrations. Caustic concentrations between 5 to 25 percent were found to be effective for the removal of sulfur contaminants, with 15 to 20 percent caustic the preferred concentration. Organic contaminants were removed with a caustic concentration between 30 to 50 percent, with 50 percent the preferred concentration. Either of the caustic solutions may be used as the "initial" solution, with the remaining solution serving as the "second" caustic solution. Preferably, the high concentration caustic is used as the initial solution.

The temperature of the caustic solutions has a direct effect on contaminant removal efficiency. As the temperature of the caustic solutions increase, the percentage of both sulfur and organic contaminants removed increase. The minimum useful temperature for both the high and the low concentration caustic solutions is 50° F. The preferred temperature range is from 72° F. to 180° F. with 140° F. the most preferred.

The sufficient contact times for the two solutions of caustic may vary but are at least 3 hours for the low (5 to 25 percent) concentration and at least 13 hours for the high (30 to 50 percent) concentration solution. The preferred contact time range for the high concentration caustic solution is from 13 to 24 hours. The most preferred contact time for the high concentration solution is about 18 hours. After this time, organic contaminants are removed with decreasing efficiency. The preferred contact time range for the removal of sulfur contaminants with the low concentration solution is from 3 to 24 hours. The most preferred contact time for the low concentration solution is from 5 to 10 hours.

Contact time is dependent upon the temperature of the caustic solution, the concentration of the caustic solution and the level of contamination by sulfur and organic compounds on the spent carbon. The suggested and preferred values serve as a guide to those skilled in the art and as parameters for the regeneration of caustic impregnated carbon.

While the description of this process calls for the regeneration of caustic impregnated carbons with either NaOH or KOH solutions, the variety of regeneration combinations will be readily apparent to those skilled in the art of carbon adsorption. For example, NaOH impregnated carbon may be regenerated with either NaOH or KOH solutions, and KOH impregnated carbons may be regenerated with either KOH or NaOH solutions. Other caustic solutions may also be used without deviating from the spirit of this invention.

Although the present invention is exemplified in conjunction with a small scale static regeneration scheme it will be readily understood by those skilled in the art of carbon adsorption, that the spirit of this invention will readily translate to a carbon recycle scheme or any large "field scale" application without any major deviation from the parameters set forth herein. These examples merely illustrate the process and are not intended to limit the applicaton of this invention in any way.

The process of the present invention can best be understood by reference to the following Examples which demonstrate the effect of the four parameters discussed above upon the regeneration of caustic impregnated activated carbon.

In general, the regeneration was carried out in a static mode. Two hundred fifty grams of spent carbon was placed in a 1000 ml Erlenmeyer flask with 700 ml caustic solution poured on top (varied concentrations). Samples were held at 72° F. and room conditions for the contact times indicated. Samples at other temperatures were controlled in hot or cold water baths. After the contact time interval passed, the caustic was removed and the carbon twice rinsed with water. Carbon samples were then dried and analysed for the percentage of removed contaminants.

EXAMPLE I

Sulfur removal from spent carbon—sulfur removal was compared using five different NaOH concentrations, all at ambient temperature over four contact times. Results for dry carbon and wetted carbon are shown below in Table I.

Sulfur removal using 50% NaOH solution was compared over a contact time range of from 1 to 96 hours. Results for dry carbon are shown in Table Ia.

TABLE I

| | PERCENT SULFUR REMOVAL FOR CAUSTIC CONCENTRATION | | | | | | | | |
|---|---|---|---|---|---|---|---|---|---|
| | Dry Carbon | | | | | Wetted | | | |
| CONTACT TIME | PERCENT NaOH CONCENTRATION | | | | | | | | |
| HOURS | 5 | 15 | 20 | 25 | 50 | 5 | 15 | 20 | 25 |
| 3 | 62.7 | 68.6 | 67.1 | 66.9 | 40.4 | * | * | 73.1 | * |
| 5 | 68.3 | 75.8 | 72.6 | 70.2 | 48.2 | 61.8 | 75.5 | 79.4 | 75.9 |
| 7½ Hours | 71.2 | 77.1 | 75.2 | 74.6 | 57.0 | * | * | 81.3 | * |
| 24 | 71.6 | 78.0 | 77.0 | 75.5 | 59.4 | 67.4 | 79.2 | 82.5 | 76.8 |

(All percentages are in percent sulfur removed)
*Data not collected at this contact time interval.

TABLE Ia

| PERCENT SULFUR REMOVAL WITH 50% CAUSTIC | |
|---|---|
| Contact Time (Hours) | Sulfur Removed* |
| 1 | 42.9 |
| 3 | 46.5 |
| 5 | 52.4 |
| 7½ | 60.5 |
| 24 | 69.4 |
| 48 | 70.5 |
| 72 | 74.5 |
| 96 | 73.1 |

*All percentages are in percent sulfur removed based on moisture-free sulfur content at contact time = 0 hours of 10.51 percent.

EXAMPLE II

Organic removal from spent carbon—Two samples of spent carbon were treated at varying concentrations of NaOH, for varying contact times to determine the most effective NaOH concentration for removal of organic contaminants. The results of these tests are shown in Tables IIa (low organic level) and IIb (high organic level). Wetted carbon data is shown in Table IIc.

TABLE IIa

| PERCENT ORGANIC REMOVAL FOR CAUSTIC CONCENTRATION ON LOW (2.84 PERCENT) ORGANIC | | | |
|---|---|---|---|
| | NaOH CONCENTRATION | | |
| Contact Time | 15% | 25% | 50% |
| 6 Hours | 86.62 | 90.49 | 100 |
| 24 Hours | 100 | 100 | 100 |

TABLE IIb

| PERCENT ORGANIC REMOVAL FOR CAUSTIC CONCENTRATION ON HIGH (9.38%) ORGANICS | | | |
|---|---|---|---|
| | NaOH CONCENTRATION | | |
| Contact Time | 15% | 25% | 50% |
| 3 Hours | 0 | 0 | 0 |
| 5 Hours | 1.95 | 8.23 | 59.30 |
| 24 Hours | 25.1 | 33.8 | 80.10 |

TABLE IIc

| PERCENT ORGANIC REMOVAL FOR CAUSTIC CONCENTRATION | | | |
|---|---|---|---|
| | NaOH Concentration | | |
| CONTACT TIME | 50% Dry | 50% Caustic to Carbon Low Ratio* Wetted (2-1) | 50% Caustic to Carbon High Ratio* Wetted (5-1) |
| 3 Hours | 0 | 0 | 0 |
| 5 Hours | 59.30 | 49.68 | 62.65 |

TABLE IIc-continued
PERCENT ORGANIC REMOVAL FOR CAUSTIC CONCENTRATION

| | NaOH Concentration | | |
|---|---|---|---|
| CONTACT TIME | 50% Dry | 50% Caustic to Carbon Low Ratio* Wetted (2-1) | 50% Caustic to Carbon High Ratio* Wetted (5-1) |
| 24 Hours | 80.10 | 61.32 | 82.84 |

(All percentages are in percent organics removed)
*Dilution factor of caustic by the water retained on the wetted carbon. (a) low ration; e.g. - 500 grams carbon to 1000 grams caustic; (b) high ratio; e.g. - 500 grams carbon to 2500 grams caustic.

EXAMPLE III

Two samples of spent impregnated carbon (NaOH) were treated with (a) the three stage process of the present invention using NaOH solutions and (b) the regeneration process of the prior art.

(a) Spent carbon (NaOH), moisture free, containing 7.84 weight percent sulfur and 9.98 weight percent organic contaminants was wetted with one bed volume of water at 72° F. The water was drained and the adsorber immediately filled with one bed volume of 50 percent NaOH solution. The caustic solution temperature was held at 72° F., for a contact time of about 18 hours. The caustic solution was removed except for ¼ bed volume. The adsorber was filled with ¾ bed volume of water producing a 15 percent NaOH solution and the sulfur removal contact time was 5 hours at a temperature of 72° F. The caustic was removed and the adsorbent was washed with two bed volumes of water. The carbon was air dried and ready for reuse. The sulfur removal was 97.5 percent and the organic removal was 100 percent.

(b) Spent carbon (NaOH), moisture free, containing 7.84 weight percent sulfur and 9.98 weight percent organic contaminants was treated with one bed volume of 50 percent NaOH solution. The caustic solution temperature was held at 72° F. for a contact time of 18 hours. The caustic solution was removed and the adsorbent was washed with one bed volume of water. The carbon was air dried and ready for reuse. The sulfur removal was 58.6 percent and the organic removal was 98.9 percent.

EXAMPLE IV

Two samples of spent impregnated carbon (NaOH) were treated with (a) the three stage process of the present invention using KOH solutions and (b) the regeneration process of the prior art.

(a) Spent carbon (NaOH), moisture free, containing 16.0 weight percent sulfur and 8.76 weight percent organic contaminants was wetted with one bed volume of water at 170° F. The water was drained and the adsorber immediately filled with one bed volume of 50 percent KOH solution. The caustic solution was held at 72° F. for a contact time of 18 hours. The KOH solution was removed. The adsorber was filled with a 15 percent KOH solution and the sulfur removal contact time was 5 hours at a temperature of 72° F. The caustic was removed and the adsorbent was washed with two bed volumes of water. The carbon was air dried and ready for reuse. The sulfur removal was 81.4 percent and the organic removal was 43.2 percent.

(b) Spent carbon (NaOH), moisture free, containing 16.0 weight percent sulfur and 8.76 weight percent organic contaminants was wetted with one bed volume of water at 170° F. The water was drained and the adsorber immediately filled with one bed volume of 15 percent KOH solution. The caustic solution was held at 72° F. for a contact time of 18 hours. The caustic was removed, the carbon was air dried and ready for reuse. The sulfur removal was 47.8 percent and the organic removal was 0.05 percent.

EXAMPLE V

Two samples of spent impregnated carbon (NaOH) were treated with the three stage process of the present invention using (a) an initial concentration of 50% caustic, (b) an initial concentration of 15% caustic and (c) the regeneration process of the prior art.

(a) Spent carbon (NaOH), moisture free, containing 7.84 weight percent sulfur and 9.98 weight percent organic contaminants was wetted with one bed volume of water at 72° F. The water was drained and the adsorber immediately filled with one bed volume of 50 percent NaOH solution. The caustic solution temperature was held at 72° F., for a contact time of 15 hours. The caustic solution was removed except for ¼ bed volume. The adsorber was filled with ¾ bed volume of water producing a 15 percent NaOH solution and the sulfur removal contact time was 5 hours at a temperature of 72° F. The caustic was removed and the adsorbent was washed with two bed volumes of water. The carbon was air dried and ready for reuse. The sulfur removal was 86 percent and the organic removal was 62 percent.

(b) Spent carbon (NaOH), moisture free, containing 7.84 weight percent sulfur and 9.98 weight percent organic contaminants was wetted with one bed volume of water at 72° F. The water was drained and the adsorber immediately filled with one bed volume of 15 percent NaOH solution. The caustic solution was held at 72° F. for a contact time of 5 hours. The caustic solution was removed and the adsorber was filled with one bed volume of 50 percent NaOH solution. The organic removal contact time was 15 hours at 72° F. The caustic was removed and the adsorbent was washed with two bed volumes of water. The carbon was air dried and ready for reuse. The sulfur removal was 78 percent and the organic removal was 58 percent.

(c) Spent carbon (NaOH), moisture free, containing 7.84 weight percent sulfur and 9.98 weight percent organic contaminants was treated with one bed volume of 50 percent NaOH solution. The caustic solution temperature was held at 72° F. for a contact time of 15 hours. The caustic solution was removed and the adsorbent was washed with one bed volume of water. The carbon was air dried and ready for reuse. The sulfur removal was 51 percent and the organic removal was 45 percent.

What is claimed is:

1. A process for the regeneration of spent caustic impregnated activated carbon by removing organic and sulfur compound contaminants which consists of:
    (a) wetting the spent carbon with water at a minimum temperature of 33° F. to dearate said carbon; and (b) treating the wetted spent carbon with a solution of from 35 to 50 percent caustic at a temperature range of from 72° to 180° F. for a contact time of from 13 to 24 hours to remove organic contaminants; and
(c) treating the spent carbon from step (b) with a solution of from 5 to 25 percent caustic at a temperature range of from 72° to 180° F. for a contact time of from 3 to 24 hours to remove sulfur contaminants.

2. The process of claim 1 wherein the caustic is NaOH or KOH.

3. The process of claim 1 wherein the concentration of the initial caustic solution is 50 percent and the contact time is about 18 hours at a temperature of 140° F.

4. The process of claim 1 wherein the concentration of the second caustic solution is from 15 to 20 percent and the contact time is from 5 to 10 hours at a temperature of 140° F.

5. A process for the regeneration of spent caustic impregnated activated carbon by removing organic and sulfur compound contaminants which consists of:
(a) wetting the spent carbon with water at a temperature of 120° F.; and
(b) treating the spent carbon with an initial caustic solution of NaOH or KOH at a concentration of 50 percent, at a contact time of about 18 hours and a temperature of 140° F.; and
(c) treating the spent carbon from step (b) with a second caustic solution of NaOH or KOH at a concentration of 15 percent, at a contact time of 5 hours and temperature of 140° F.

* * * * *